(12) United States Patent
Grann et al.

(10) Patent No.: US 6,212,312 B1
(45) Date of Patent: Apr. 3, 2001

(54) OPTICAL MULTIPLEXER/DEMULTIPLEXER USING RESONANT GRATING FILTERS

(75) Inventors: Eric B. Grann, San Ramon, CA (US); L. Curtis Maxey, Powell, TN (US)

(73) Assignee: U.T. Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/398,242

(22) Filed: Sep. 17, 1999

(51) Int. Cl.$^7$ .................................................. G02B 6/28
(52) U.S. Cl. ................................................................ 385/24
(58) Field of Search .......................... 385/24–25, 147; 340/566, 522, 825.72; 367/136; 455/509, 517

(56) References Cited

U.S. PATENT DOCUMENTS

| | | | |
|---|---|---|---|
| 3,806,804 | * 4/1974 | Mills et al. | 340/825.72 |
| 4,111,524 | 9/1978 | Tomlinson, III | 350/96.19 |
| 4,474,424 | 10/1984 | Wagner | 350/96.16 |
| 5,194,848 | * 3/1993 | Kerr | 340/228 |
| 5,216,680 | 6/1993 | Magnusson et al. | 372/20 |
| 5,457,760 | 10/1995 | Mizrahi | 385/37 |
| 5,583,683 | 12/1996 | Scobey | 359/127 |
| 5,621,854 | * 4/1997 | Hollier | 704/233 |
| 5,680,236 | 10/1997 | Van Der Tol | 359/127 |
| 5,696,615 | 12/1997 | Alexander | 359/134 |
| 5,794,186 | * 8/1998 | Hollier | 704/233 |

OTHER PUBLICATIONS

L. Mashev and E. Popov, "Zero Order Anomaly of Dielectric Coated Gratings," *Optics Communications*, 55:377–380 (Oct. 15, 1985).

S. Peng and G.M. Morris, "Experimental Investigation of Resonant Grating Filters based on Two–Dimensional Gratings," *SPIE*, 2689:90–94 (1996).

E. Popov, L. Mashev and D. Maystre, "Theoretical study of the anomalies of coated dielectric gratings," *Optica Acta*, 33:607–619 (1986).

S.S. Wang, R. Magnusson and J.S. Bagby, "Guided–mode resonances in planar electric–layer diffraction gratings," *J. Opt. Soc. Am. A*, 7:1470–1474 (1990).

\* cited by examiner

*Primary Examiner*—Akm E. Ullah
(74) *Attorney, Agent, or Firm*—Akerman, Senterfitt & Eidson, P.A.

(57) ABSTRACT

A wavelength division multiplex/demultiplexer (WDM) has a plurality of narrow-band zeroth order resonant grating filters (10*a*–10*e*) to multiplex or demultiplex multiple wavelengths that have very close channel spacing. In one embodiment, a plurality of these filters (10*a*14 10*e*) are assembled in a block (20) in parallel and at an angle to a propagation axis to reflect signals for a plurality of discrete frequency channels. The block spacing material (21) can be liquid or solid. In another embodiment, the angular orientation of the resonant grating filters (10*f*–10*g*) is varied slightly to provide reflected signals for the plurality of discrete frequency channels. Crosstalk between channels can be reduced by reflecting each signal three times. Individual filters can be of binary structure or a sinusoidal grating (16) and can be made using thin film techniques.

19 Claims, 6 Drawing Sheets

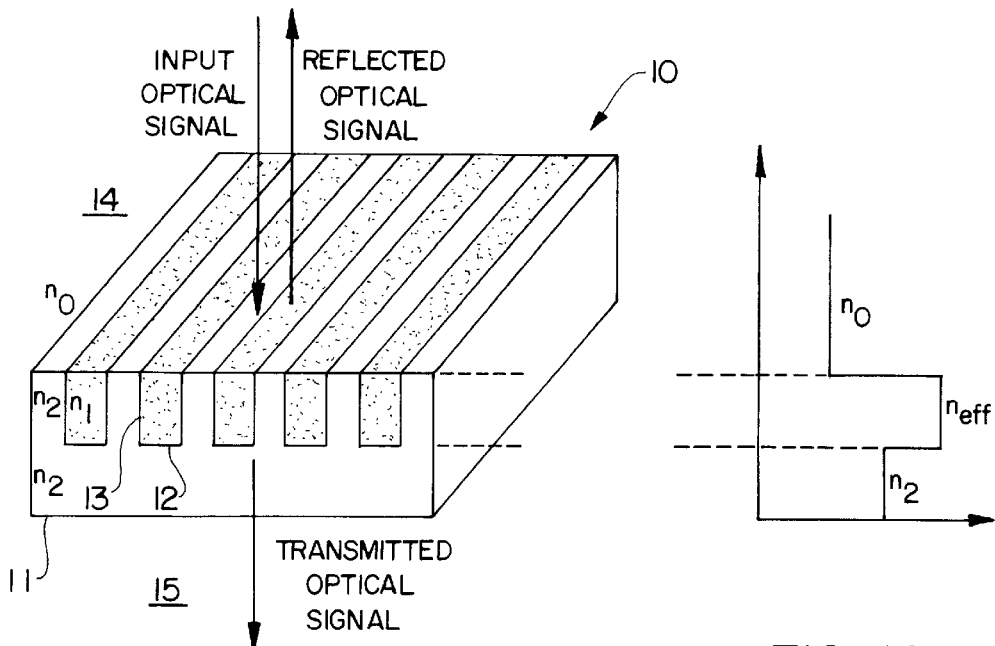
FIG. 1
(PRIOR ART)
FIG. 1A
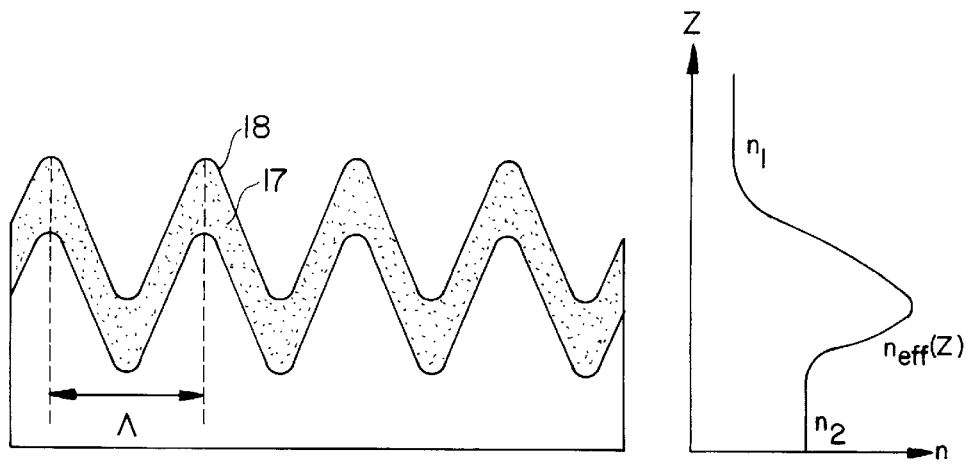
FIG. 2
(PRIOR ART)
FIG. 2A

OPTICAL MULTIPLEXER/DEMULTIPLEXER USING RESONANT GRATING FILTERS

This invention was made with Government support under Contract No. DE-AC05-96OR22464 awarded by the U.S. Department of Energy. The Government has certain rights in the invention.

DESCRIPTION OF THE BACKGROUND ART

Wavelength Division Multiplexing (WDM) is a technique for separating light into optical waves of differing frequencies to increase the number of channels and the amount of information that can be transmitted through a single fiber optic system. The bandwidth or frequency response of a single channel is limited by both the laser source and the detector. Therefore, in order to increase the total bandwidth of the communication system, additional wavelength channels are used. The realistic bandwidth (approximately 30 GHz) of a fiber optic system is limited by both the absorption and dispersion characteristics of optical fiber. In order to utilize as much of this bandwidth as possible, each wavelength channel should be closely spaced. For example, a channel spacing of 0.8 nm around 1550 nm corresponds to a single channel bandwidth of 0.4 nm, which is approximately 50 GHz.

Tomlinson, III, U.S. Pat. No. 4,111,824, shows a fiber optic system and a diffraction grating for performing the multiplexing/demultiplexing function. Wagner, U.S. Pat. No. 4,474,424, discloses the use of several interference filters integrated into a single device for reflecting light at different angles. This device is said to improve upon the channel spacing and bandwidth of Tomlinson.

Scobey, U.S. Pat. No. 5,583,683, discloses the use of resonant interference filters, which pass only a single wavelength of light and reflect other wavelengths. The light is reflected back and forth within a solid block filter element, exiting at different points to distribute the light in several beams of different wavelengths.

Mizrahi, U.S. Pat. No. 5,457,760, discloses arrays of optical filtering elements in the form of Bragg gratings to create a desired wavelength passband in an optical filter. Optical signals from a demultiplexer are transmitted over a plurality of waveguides in the form of optical fibers or planar members.

Mashev and Popov in "Zero Order Anomaly of Dielectric Coated Gratings," *Optics Communications*, Vol. 55, No. 6 (Oct. 15 1985) disclose a zeroth order diffraction grating which produces a resonance anomaly, in which light at the zeroth order is reflected. This operation can be tuned to provide a narrow-band wavelength filter. The grating is provided by a three-layer dielectric grating having an element of material with grooves in which the dielectric is air, and the grating is then coated with a third dielectric material.

Magnusson et al., U.S. Pat. No. 5,216,680, discloses the use of a resonant filter constructed with thin film materials for providing a tuneable laser beam. In Magnusson, the light signal is used to operate an optical switch.

Current wavelength division multiplexing/demultiplexing (WDM) systems are expensive to manufacture, have high optical losses, and can suffer from inadequate performance.

SUMMARY OF THE INVENTION

The invention relates to a solid state filter assembly incorporating a plurality of resonant grating filters for demultiplexing or multiplexing optical signals to process a plurality of discrete wavelengths.

The invention in incorporated in an optical signal multiplexer/demultiplexer that comprises a plurality of resonant grating filters. This allows all wavelength (frequency) channels to be separated or combined in a single device. The device is distinguishable from other technologies in its use of resonant grating filters for selecting the desired wavelength. Advantageous features include manufacturing ease, potential for extremely high throughput and performance, and ability to be integrated into an array or stack containing a large number of filters for selecting specific wavelengths.

The invention is more particularly exemplified in an optical device for operation as either a multiplexer or demultiplexer. The device comprises a plurality of resonant grating filters arranged along a propagation axis which extends to a multiplexed optical channel for a plurality of optical signal frequencies. The filters reflect optical signals at respective resonant frequencies, and the filters transmit optical signals at frequencies other than their respective resonant frequencies along the propagation axis. The filters are each arranged at a non-perpendicular angle to the propagation axis to reflect the reflection signal between the propagation axis and a respective one of a plurality of discrete frequency channels provided for carrying optical signals having a plurality of respective discrete frequencies.

The filters of the present invention are preferably zeroth order diffraction grating filters. Such filters are further preferably narrow-band (potentially 1–2 Angstroms bandwidth) with extremely high throughput. The filters can be replicated from a single master, are relatively inexpensive to mass produce, and can be integrated into high density arrays from discrete wavelength discrimination. The center wavelength of the narrow-band filter can also be tuned over a small range by altering one of the grating parameters (angle of incidence, index of refraction, grating period, etc.).

These and other objects of the present invention will become readily apparent from the following specification and from the drawings which are incorporated herein and which describe and illustrate several preferred embodiments of the invention. Such embodiments are not, however, exhaustive of all possible embodiments, and therefore reference should be made to the claims which follow the description for the legal scope of the invention.

BRIEF DESCRIPTION OF THE DRAWINGS

FIG. 1 is a perspective diagram of a first embodiment of an individual resonant grating filter of the prior art;

FIG. 1A is refraction index diagram for the embodiment of FIG. 1;

FIG. 2 is a perspective diagram of a second embodiment of an individual resonant grating filter of the prior art;

FIG. 2A is refraction index diagram for the embodiment of FIG. 2;

DETAILED DESCRIPTION OF THE PREFERRED EMBODIMENTS

Figure 3:
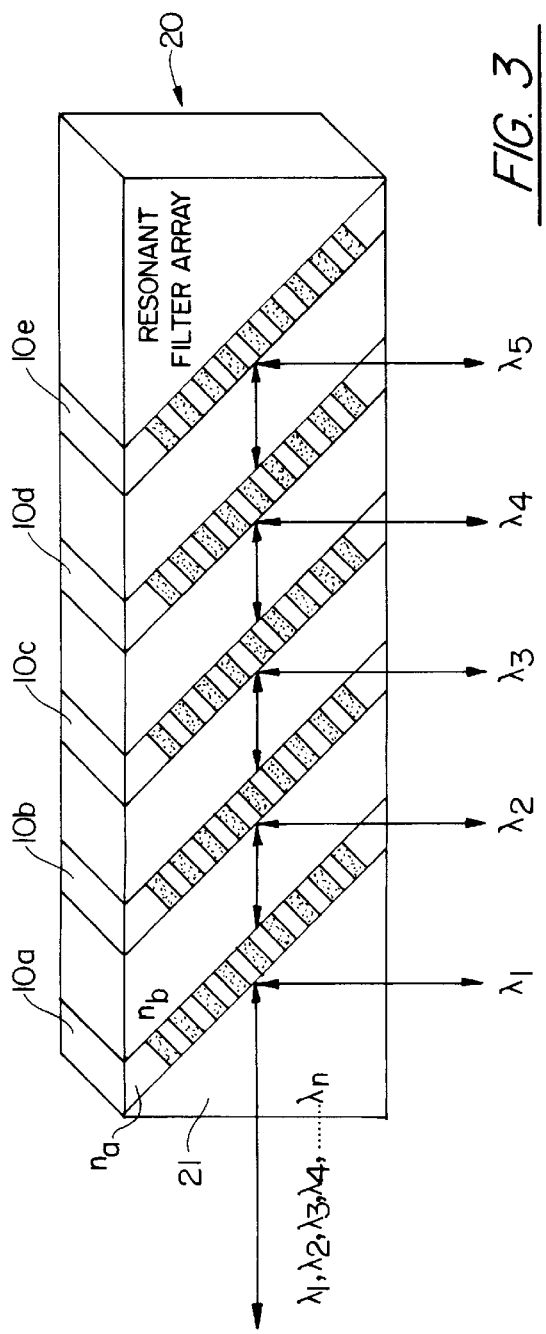
FIG. 3 is a first embodiment of a multiplexing/demultiplexing device of the present invention incorporating a plurality of the filters seen in FIG. 1.

FIG. 1 illustrates a binary resonant grating structure 10 having a substrate 11 of light transmissive material of refractive index, $n_2$, a plurality of parallel grooves 12, and inserts 13 for the grooves provided by a second light transmissive material of refractive index $n_1$. In this context, "light" means not only signals in the spectrum of visible light, but also signals in the full spectrum of frequencies typically handled by optical transmission systems of the known prior art. The binary grating structure 10 provides a zeroth order diffraction grating (no higher order diffracted fields). Light signals are either passed or reflected. The index of refraction of the resulting filter 10 can be represented by an effective uniform homogeneous material having an effective index of refraction ($n_{eff}$).

In the case where a grating structure is viewed from either an input region 14 or an output region 15 having a refractive index, $n_o$, and the diffraction index within the grating region satisfies the index criteria of $n_o < n_{eff} > n_2$, a surface propagating field will be produced which is trapped within the grating region due to total internal reflection (effective waveguide).

FIG. 1A illustrates that a zeroth order grating region defined by $n_1$ and $n_2$ has an effective index, $n_{eff}$, which is higher than the surrounding homogeneous regions, thus giving it the appearance of a planar (effective) waveguide. If a diffracted field is coupled into the mode of this effective waveguide, the field will resonate and reflect all of the light energy backwards. This resonance effect results in a total reflection of the incident field from the surface, and it is extremely sensitive to wavelength to provide a narrow-band reflection filter. All other frequencies pass through the filter.

FIG. 2 shows another embodiment of a single resonant grating filter 16 in which the substrate 17 of refractive index $n_2$ has a sinusoidal shape and may have a dielectric coating 18 of refractive index, $n_1$. The effective index of refraction for the filter, $n_{eff}$, is again greater than the index of the substrate or the coating as illustrated in the graph of refraction index in FIG. 2A. The one dimensional grating parameters are as follows: substrate index of refraction=1.52, grating period=594.95 nm, modulation depth of grating=450 nm, coating index of refraction=1.58, coating thickness=600 nm.

The present invention utilizes a plurality of resonant grating filters (such as elements 10a–10e in FIG. 3, for example) for multiplexing and demultiplexing optical signals (WDM system). Multiplexing is the conversion of multiple signals in parallel to signals transmitted through a single channel. Demultiplexing distributes signals from a single channel to multiple channels operating in parallel. There are a number of architectural configurations for constructing a WDM system with resonant grating filters according to the present invention.

Referring to FIG. 3, a device 20 includes a plurality of zeroth order resonant grating filters 10a–10e of the type described for FIG. 1, which are assembled in a stacked array with each filter 10a–10e at an angle of forty-five degrees between a horizontal reference and a vertical reference. The resonant filters 10a–10e can be embedded in material 21 having an index of refraction, $n_b$, which matches the index of the substrate material ($n_a$) of the resonant filter (i.e., $n_a = n_b$). The material 21 can be a liquid, such as a light transmissive oil, or it can be a solid such as a light transmissive plastic material. If adhesive is used to assemble the solid material with the filters 10a–10e, a light transmissive material, such an epoxy, is used. The filters 10a–10e can also be mounted between top and bottom supporting structures (not shown) each having a sawtooth edge with angled surfaces for orienting the filters 10a–10e at the selected angle. The resulting assembly 20 can take a prism block form as seen in FIG. 3, or could take on other forms as well.

The effective index ($n_{eff}$) of the zeroth order grating region is also very close to the substrate index. Therefore, since the index of refraction is same for both the input and output regions surrounding each resonant structure, the Fresnel reflections and therefore the cross-talk between channels is minimized.

A modified form of FIG. 3 can be constructed using the sawtooth mounting members (top and bottom) and using a plurality of sinusoidal gratings of the type seen in FIG. 2, having their axes oriented at about forty-five degrees. Spacer material could be used in the form of liquid or solid material.

In FIG. 3, the incident signal impinges on the filters 10a–10e at an identical angle θ, to provide reflected wavelengths $\lambda_1, \lambda_2, \lambda_3, \lambda_4 \ldots \lambda_n$, respectively, in a demultiplexing mode. The transmissive spacer material 21 assembled in spaces between the resonant grating filters, has a refractive index such that the incident signal received by a second one of said resonant grating filters 10b is different from the incident signal received by a first one of said resonant grating filters 10a. This shift in frequency and wavelength occurs for filters 10c–10e as well. This results in differing wavelengths $\lambda_1, \lambda_2, \lambda_3, \lambda_4 \ldots \lambda_n$. The bidirectional arrows in FIG. 3 represents that the signals of wavelengths $\lambda_1, \lambda_2, \lambda_3, \lambda_4 \ldots \lambda_n$ can also be transmitted along separate channels, and be reflected back along a common axis of propagation in the multiplexing mode.

Figure 4:
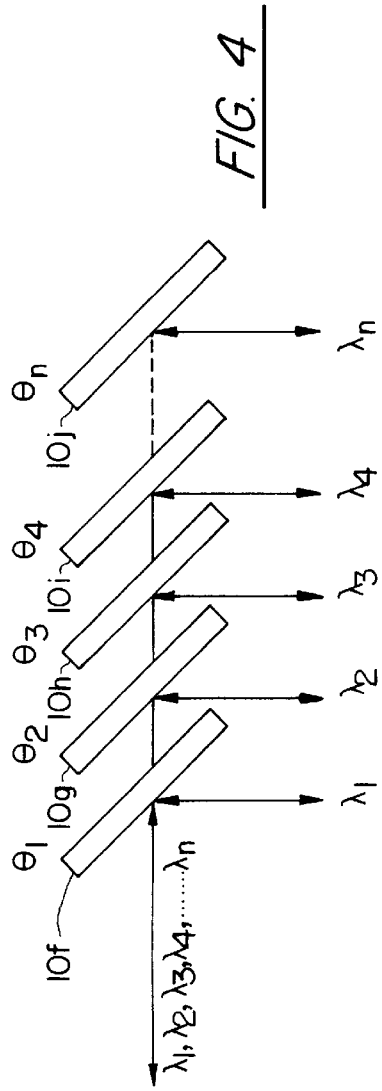
FIG. 4 is a second embodiment of a multiplexing/demultiplexing device of the present invention.

FIG. 4 shows a second embodiment of plurality of spaced nearly parallel filters 10f–10j, where each filter 10f–10j is identical and is shifted to a respective, slightly varying one of angles, $\theta_1, \theta_2, \theta_3, \theta_4, \ldots \theta_n$ around forty-five degrees to provide reflected wavelengths $\lambda_1, \lambda_2, \lambda_3, \lambda_4 \ldots \lambda_n$, respectively, in a demultiplexing mode. The bidirectional arrows in FIG. 4 represents that the signals of wavelengths $\lambda_1, \lambda_2, \lambda_3, \lambda_4 \ldots \lambda_n$ can also be transmitted along separate channels, and be reflected back along a common axis of propagation in the multiplexing mode.

Figure 5A:
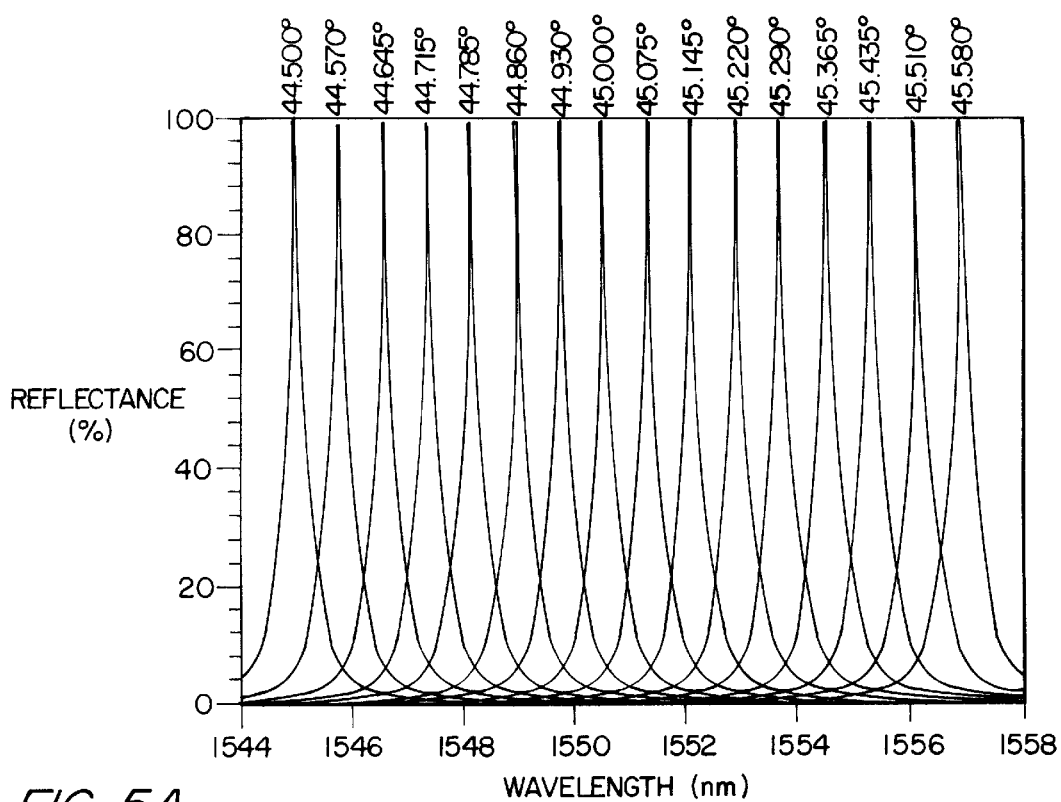
FIG. 5A and FIG. 5B are reflectance vs. wavelength diagrams for the embodiment of FIG. 4.
Figure 5B:
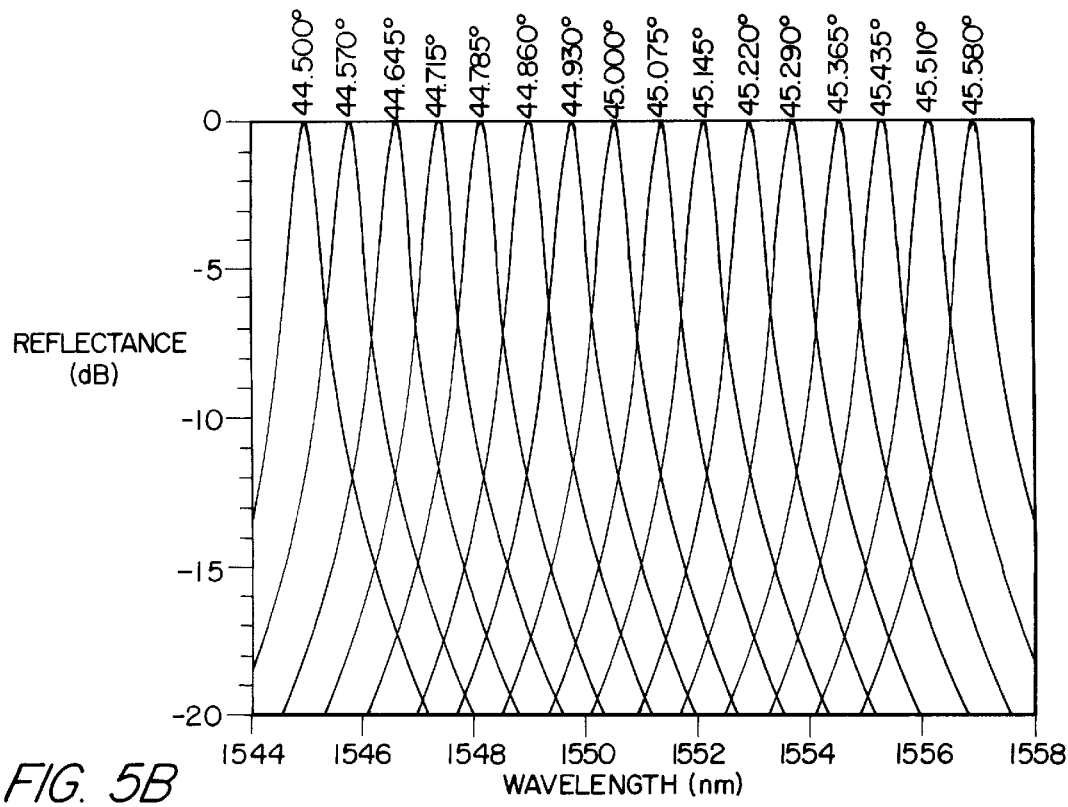

FIGS. 5A and 5B illustrates the performance of a 16-channel WDM system based on FIG. 3 or FIG. 4, each of which provides a single resonant filter set. Reflectance of 100% occurs around certain center frequencies as seen in FIG. 5a. The drop off in response to sideband frequencies is shown in the decibel plot of FIG. 5B. There is some crosstalk between –5 dB and –10 dB.

Figure 6:
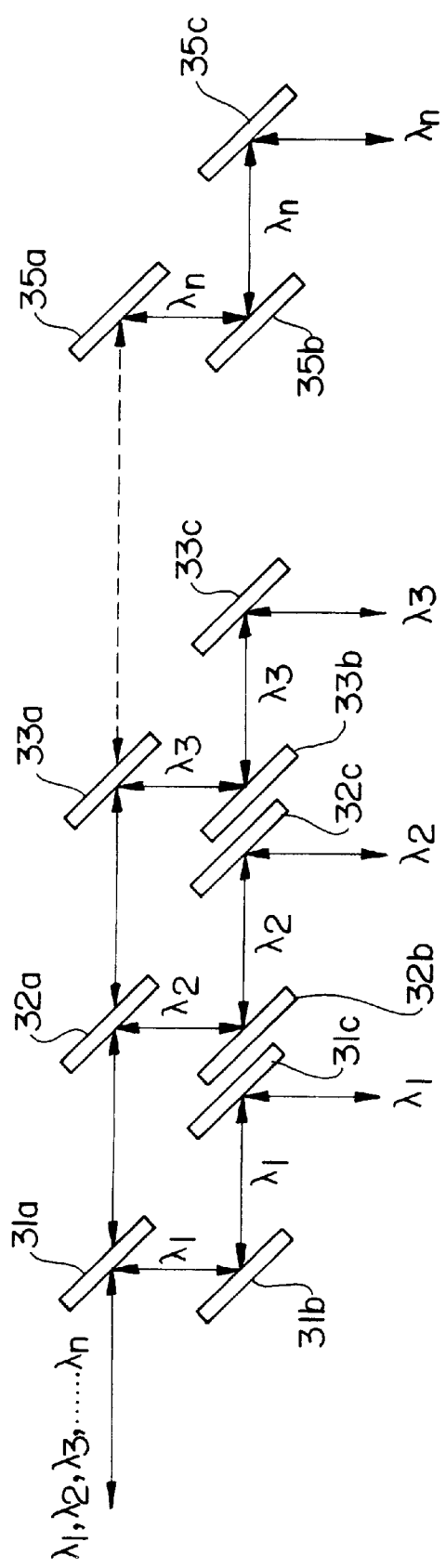
FIG. 6 is a third embodiment of a multiplexing/demultiplexing device of the present invention.

FIG. 6 shows a triple reflection filter embodiment, in which each channel has its signal reflected through three sub filters, such as sub-filters 31a–31c for $\lambda_1$. Each set of three filters 32a–32c, 33a–33c, 34a–34c and 35a–35c corresponds to channels for $\lambda_1, \lambda_2, \lambda_3, \lambda_4 \ldots \lambda_n$. These signals are multiplexed and demultiplexed to a single channel 30. The triple resonant filter set provides for each channel to reflect off three identical filters, thus reducing the side-bands.

Figure 7A:
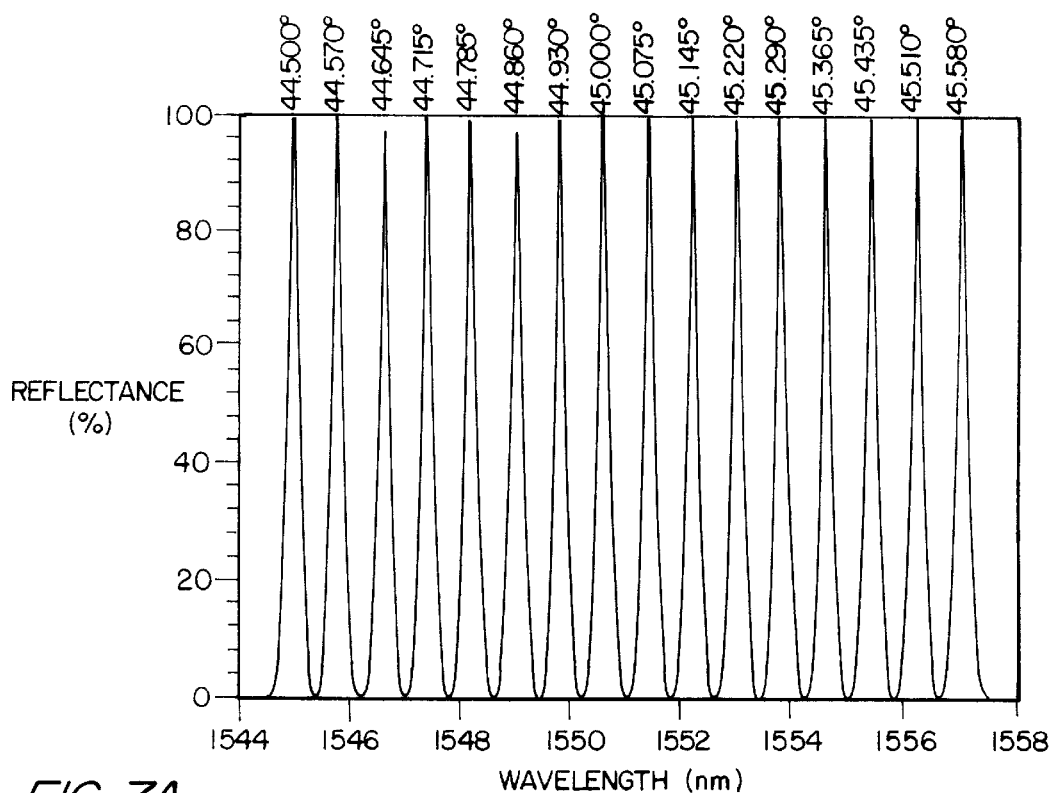
FIG. 7A and FIG. 7B are reflectance vs. wavelength diagrams for the embodiment of FIG. 6.
Figure 7B:
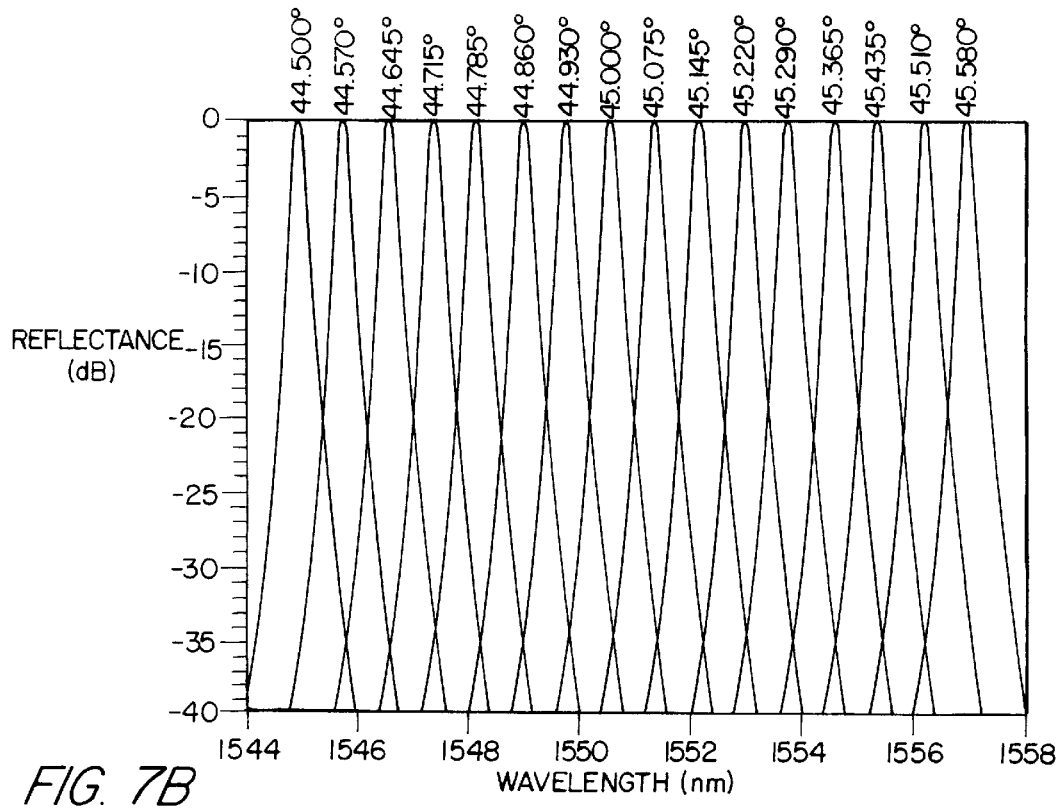

The embodiment in FIG. 6 reduces channel cross-talk. FIGS. 7A and 7B illustrate the performance of a triple resonant filter set based on the same filter design above. The channel reflectance is still 100% around the tuned channel frequencies, u note the reduction in channel cross-talk to the –20 dB region in FIG. 7B. Channel separation is 0.8 nm, allowing 16 channels in 14.4 nm and twice to three times that many total possible channels in a fiber optic system. The total available bandwidth is about 50 nm around a wavelength of 1550 nm.

There are many advantages of the present invention. Because each resonant structure is embedded within an index-matched region, both the input and output regions of the resonant filter have the same material characteristics. Therefore, an incident field will experience minimal or no Fresnel reflections away from the resonance peak, to limit sideband reflections.

Resonant structures can be placed at a particular angle with respect to the incident field to redirect the resonant energy to another portion of the planar waveguide.

Resonant filters do not have any inherent optical losses giving then a 100% throughput at the resonance center wavelength.

The systems of the present invention systems can be designed to be either sensitive or insensitive to the incident fields polarization.

A one dimensionally structured resonant filter exhibits polarization properties, while a symmetric two dimensionally structured resonant filter operates with unpolarized light. Resonant grating filters can be designed using several different architectures, including binary structures and continuous surface relief structures. A structure such as illustrated in FIG. 1 is polarization sensitive, because it is considered a one-dimensional grating structure (grooves running in parallel in one direction). In order to construct a resonant filter that is not polarization-sensitive, a symmetrical two-dimensional architecture can be used.

Figure 8A:
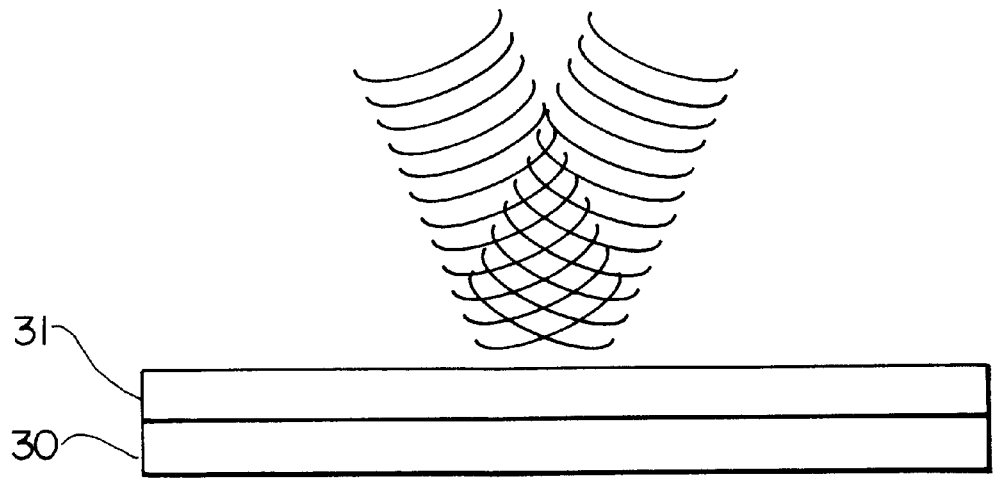
FIGS. 8A, 8B and 8C illustrate a method of making a plurality of the filters of the type in FIG. 2 for assembly in one of the embodiments of FIGS. 3 and 4.
Figure 8B:
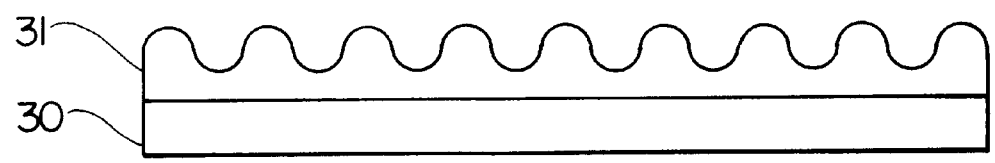
Figure 8C:

FIGS. 8A, 8B and 8C show a method of producing a master using thin film techniques, and then using the master to make a plurality of the sinusoidal type filters of the type shown in FIG. 2 above. There a number of fabrication technologies available such as direct-write, e-beam lithography; direct-write, focused-ion beam lithography; interferometry and gray-scale mask lithography. FIG. 8A illustrates an interferometry method in which two beams are focused on a substrate 30 having a layer of photoresist material 31 deposited thereon. When the beams interfere they produce a wave pattern of intensity that develops the photoresist in proportion to the intensity or amplitude in a specific region. If the intensity is low due to low reinforcement, the photoresist is cured less. The result is a layer of photoresist developed in a sinusoidal or grated pattern as seen in FIG. 8B. Next, if a beam is applied to etch the substrate, its effects will be tempered by thicker portions of photoresist, but affected less by thinner layers of photoresist. Consequently, the sinusoidal pattern is transferred to the substrate, which becomes a master for making a plurality of filters having a sinusoidal grating surface. Filter substrates can be made from the master using techniques, such as plating, coating, pressing, casting, injection molding. The materials for the sinusoidal filter bodies may include plastics, epoxies, glasses and metals.

A coating can be applied to these filter bodies using thin film coating with a material having a relatively higher index of refraction than the substrate, or by ion implantation in the surface to create a region of higher refractive index.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

We claim:

1. An optical device for operation as either a multiplexer or demultiplexer, the device comprising:

a plurality of resonant grating filters arranged along a propagation axis that extends to a multiplexed optical channel for a plurality of optical signal frequencies;

wherein said filters reflect optical signals at respective resonant frequencies, and wherein said filters transmit optical signals at frequencies other than their respective resonant frequencies along the propagation axis; and wherein each of said filters is arranged at a non-perpendicular angle to the propagation axis to reflect a respective optical signal between the propagation axis and a respective one of a plurality of discrete frequency channels, which are provided for carrying optical signals having respective discrete frequencies.

2. The optical device of claim 1, wherein the resonant grating filters are binary resonant filter grating structures.

3. The optical device of claim 1, wherein the resonant grating filters have a substrate with a sinusoidal surface.

4. The optical device of claim 3, wherein the sinusoidal surface is coated with dielectric coating.

5. The optical device of claim 1, further comprising light transmissive spacer material assembled in spaces between the resonant grating filters, said light transmissive spacing material having a refractive index such that an incident signal received by a second one of said resonant grating filter is different from an incident signal received by a first one of said resonant grating filters.

6. The optical device of claim 5, wherein the resonant grating filters are binary resonant filter grating structures.

7. The optical device of claim 6, wherein the light transmissive spacer material is a solid.

8. The optical device of claim 6, wherein the light transmissive spacer material is a liquid.

9. The optical device of claim 5, wherein the resonant grating filters have a substrate with a sinusoidal surface.

10. The optical device of claim 9, wherein the sinusoidal surface is coated with dielectric coating.

11. The optical device of claim 1, said resonant grating filters are spaced apart by air spaces, and wherein each of said resonant grating filters is disposed at a slightly different angle to the propagation axis than a preceding one of said resonant grating filters to reflect a signal which differs in frequency from a reflected signal for a preceding one of said resonant grating filters.

12. The optical device of claim 11, wherein the resonant grating filters have structures which are identical.

13. The optical device of claim 11, further comprising at least one additional resonant grating filter in each channel to reflect each resonant frequency signal at one additional time.

14. The optical device of claim 11, further comprising at least two additional resonant grating filters in each channel to reflect each resonant frequency at least two additional times.

15. The optical device of claim 11, wherein the resonant grating filters are binary resonant filter grating structures.

16. The optical device of claim 11, wherein the resonant grating filters have a substrate with a sinusoidal surface.

17. The optical device of claim 14, wherein the sinusoidal surface is coated with dielectric coating.

18. The optical device of claim 1, wherein the resonant grating filters are zeroth order grating filters.

19. The optical device of claim 1, wherein the resonant grating filters have structures which are identical.

* * * * *